United States Patent
Zhang (10) Patent No.: US 8,510,627 B2
(45) Date of Patent: Aug. 13, 2013

(54) METHOD, SYSTEM AND DEVICE FOR MONITORING ERROR CODE OF COMMON PUBLIC RADIO INTERFACE (CPRI) LINK

(75) Inventor: Panke Zhang, Shenzhen (CN)

(73) Assignee: ZTE Corporation, Shenzhen, Guandong Province (CN)

( * ) Notice: Subject to any disclaimer, the term of this patent is extended or adjusted under 35 U.S.C. 154(b) by 0 days.

(21) Appl. No.: 13/576,026

(22) PCT Filed: Dec. 15, 2010

(86) PCT No.: PCT/CN2010/079821
§ 371 (c)(1),
(2), (4) Date: Jul. 30, 2012

(87) PCT Pub. No.: WO2012/009926
PCT Pub. Date: Jan. 26, 2012

(65) Prior Publication Data
US 2013/0159821 A1    Jun. 20, 2013

(30) Foreign Application Priority Data
Jul. 19, 2010 (CN) .......................... 2010 1 0229899

(51) Int. Cl.
*H03M 13/00* (2006.01)
(52) U.S. Cl.
USPC ............ 714/758; 714/781; 714/776; 714/805
(58) Field of Classification Search
USPC ........................................ 714/758, 781, 807
See application file for complete search history.

(56) References Cited

U.S. PATENT DOCUMENTS

| | | | |
|---|---|---|---|
| 7,162,682 B2 | 1/2007 | Lewis | |
| 7,680,149 B2 * | 3/2010 | Liu et al. | 370/466 |
| 7,929,471 B2 * | 4/2011 | Oksman | 370/300 |
| 8,050,296 B2 * | 11/2011 | Osterling | 370/503 |
| 8,130,729 B2 * | 3/2012 | Hara | 370/335 |
| 8,369,226 B2 * | 2/2013 | Peng et al. | 370/242 |

FOREIGN PATENT DOCUMENTS

| | | |
|---|---|---|
| CN | 1736050 A | 2/2006 |
| CN | 101394197 A | 3/2009 |
| EP | 2207287 A2 | 7/2010 |

OTHER PUBLICATIONS

International Search Report; Apr. 21, 2011; issued in International Patent Application No. PCT/CN2010/079821.

* cited by examiner

*Primary Examiner* — Esaw Abraham
(74) *Attorney, Agent, or Firm* — Henry B. Ward, III; Moore & Van Allen PLLC (57) ABSTRACT

A method, system and device for monitoring error code of CPRI link are disclosed. The method comprises: a CPRI link data transmitting end forming data to be transmitted into frames, outputting data, and calculating to obtain FCS of each frame; the CPRI link data transmitting end adds FCS of a former frame into FCS field of a current frame when forming frame; a CPRI link data receiving end splitting frame of received frame data to obtain FCS of the former frame carried in the current frame, calculating received frame data to obtain FCS of the current frame, caching FCS of the current frame, comparing FCS of the former frame which is carried in the current frame with cached FCS of the former frame, and judging CPRI link has error codes if the comparison result is inconsistent. Error code condition of CPRI link can be monitored without influencing normal service operation.

18 Claims, 4 Drawing Sheets

METHOD, SYSTEM AND DEVICE FOR MONITORING ERROR CODE OF COMMON PUBLIC RADIO INTERFACE (CPRI) LINK

FIELD OF THE INVENTION

The present invention relates to the technical field of communications, and in particular to a method, a system and a device for monitoring an error code of a Common Public Radio Interface (CPRI) link.

BACKGROUND OF THE INVENTION

In recent years, with the growth of wireless communication technologies, a new type of base station gradually separates a Base band Unit (BBU) and a Radio Remote Unit (RRU) of a traditional base station, and the separated BBU and RRU are connected by optical fibres or cables. And meanwhile, some base band radio frequency interface standards are generated, wherein the CPRI is a base band radio frequency interface standard which is widely used in the base station devices in the wireless communication field.

As the BBU and the RRU are connected by adopting mediums of the optical fibres or the cables, and have a high data rate which usually reaches several Gbps, the high data rate brings very high requirements on stability of physical layers. The error rate of the CPRI link needs to be monitored so as to evaluate the performance of the CPRI link.

The existing realization method is generally to add a pseudo random sequence generation and check module on the BBU and the RRU, so as to monitor the error codes of a downlink channel and an uplink channels of the CPRI. The defect of such solution is that the measurement can be realized only by interrupting a service. Moreover, the measurement of the error codes can be effective by averaging the numbers of the error codes after testing for a long time. Therefore, the testing method in the related art can be suitable only for the condition that the service is allowed to be interrupted for a long time.

SUMMARY OF THE INVENTION

The present invention provides a method, a system and a device for monitoring an error code of a CPRI link, which solves the problem that the error codes can be monitored only under the condition of interrupting a service for a long time in the related art.

According to one aspect of the present invention, a method for monitoring an error code of a CPRI link is provided, comprising:

a CPRI link data transmitting end forming data to be transmitted into frames, outputting the data, and calculating to obtain a Frame Check Sequence (FCS) of each frame; wherein, the CPRI link data transmitting end adds the FCS of a former frame into an FCS field of a current frame when forming the frame; and a CPRI link data receiving end splitting the frame of received frame data to obtain the FCS of the former frame which is carried in the current frame, calculating the received frame data to obtain the FCS of the current frame, caching the FCS of the current frame, comparing the FCS of the former frame which is carried in the current frame with the cached FCS of the former frame, and judging that there is an error code in the CPRI link if the comparison result is that the FCS of the former frame which is carried in the current frame is inconsistent with the cached FCS of the former frame.

Preferably, the CPRI link data transmitting end and the CPRI link data receiving end adopt a Cyclic Redundancy Check (CRC) algorithm to obtain the FCS of the frame data.

Preferably, the FCS field is defined in a user-defined region in a CPRI control word.

Preferably, a length of each FCS control word which is defined in the FCS field is 8 bit.

Preferably, after the step of the CPRI link data receiving end comparing the FCS of the former frame which is carried in the current frame with the cached FCS of the former frame, the method further comprises:

when a preset super-frame timer T2 expires, if the former frame is checked to have the error code and a preset error code statistical counter is not full, the CPRI link data receiving end adding one to the error code statistical counter; and when a preset error code statistical timer T1 expires, the CPRI link data receiving end judging whether the error code statistical counter arrives a preset threshold value, if yes, the CPRI link data receiving end alarming an upper level; wherein T1>T2.

Preferably, after the error code statistical timer T1 expires, the CPRI link data receiving end caching a result counted by the error code statistical counter, and then resetting the error code statistical counter.

According to another aspect of the present invention, a system for monitoring an error code of a CPRI link is provided, comprising:

a CPRI link data transmitting device, which comprises:

a CPRI frame-forming module, configured to form data to be transmitted into frames, and then output the data; wherein, when forming the frames, the CPRI frame-forming module adds an FCS, which is transmitted by an FCS acquisition module, of a former frame into an FCS field of a current frame;

the FCS acquisition module, configured to receive frame data which are output by the CPRI frame-forming module, calculate to obtain the FCS of each frame, and transmit the FCS to the CPRI frame-forming module;

a CPRI link data receiving device, which comprises:

a CPRI frame-splitting module, configured to split the frame of the frame data which is output by the CPRI frame-forming module to obtain the FCS of the former frame which is carried in the current frame, and transmit the FCS to an error code monitoring module;

the error code monitoring module, configured to calculate the frame data which is transmitted by the CPRI frame-forming module to obtain the FCS of the current frame and cache the FCS of the current frame, compare the FCS of the former frame which is transmitted by the CPRI frame-splitting module with the cached FCS of the former frame, and judge that there is an error code in the CPRI link if the comparison result is that the FCS of the former frame which is transmitted by the CPRI frame-splitting module is inconsistent with the cached FCS of the former frame.

Preferably, the error code monitoring module is further configured to: when a preset super-frame timer T2 expires, if the former frame is checked to have the error code and a preset error code statistical counter is not full, add one to the error code statistical counter; and is configured to: when a preset error code statistical timer T1 expires, judge whether the error code statistical counter arrives a preset threshold value, if yes, alarm an upper level; wherein, T1>T2.

Preferably, the error code monitoring module is further configured to: after the error code statistical timer T1 expires, cache a result counted by the error code statistical counter and reset the error code statistical counter.

According to still another aspect of the present invention, a device for monitoring an error code of a CPRI link is provided, comprising:

a CPRI frame-forming module, configured to form data to be transmitted into frames, and then output the data; wherein, when forming the frames, the CPRI frame-forming module adds an FCS, which is transmitted by an FCS acquisition module, of a former frame into an FCS field of a current frame;

the FCS acquisition module, configured to receive frame data which are output by the CPRI frame-forming module, calculate to obtain the FCS of each frame, and transmit the FCS to the CPRI frame-forming module;

a CPRI frame-splitting module, configured to split the frame of the frame data which is transmitted by a CPRI link data transmitting end to obtain the FCS of the former frame which is carried in the current frame, and transmit the FCS to an error code monitoring module;

the error code monitoring module, configured to calculate the frame data which is transmitted by the CPRI link data transmitting end to obtain the FCS of the current frame and cache the FCS of the current frame, compare the FCS of the former frame which is transmitted by the CPRI frame-splitting module with the cached FCS of the former frame, and judge that there is an error code in the CPRI link if the comparison result is that the FCS of the former frame which is transmitted by the CPRI frame-splitting module is inconsistent with the cached FCS of the former frame.

Preferably, the error code monitoring module is further configured to: when a preset super-frame timer T2 expires, if the former frame is checked to have the error code and a preset error code statistical counter is not full, add one to the error code statistical counter; and is configured to: when a preset error code statistical timer T1 expires, judge whether the error code statistical counter arrives a preset threshold value, if yes, alarm an upper level; wherein, T1>T2.

Preferably, the error code monitoring module is further configured to: after the error code statistical timer T1 expires, cache a result counted by the error code statistical counter and reset the error code statistical counter.

Compared with the related art, the present invention has the advantages as follows.

The error code conditions of the CPRI link can be monitored without influencing the normal service operations by adopting the technical solution provided by the present invention.

BRIEF DESCRIPTION OF THE DRAWINGS

In order to describe the technical solutions of the related art or the embodiments of the present invention more clearly, the following drawings which need to be adopted in the descriptions of the embodiments or the related art are simply introduced. Obviously, for those skilled in the art, the drawings described below are only some embodiments of the present invention, and other drawings can be obtained according to these drawings without offering creative work.

DETAILED DESCRIPTION OF THE EMBODIMENTS

The technical solutions in the embodiments of the present invention are clearly and completely described below with reference to the drawings in the embodiments of the present invention. Obviously, the described embodiments are only part of the embodiments of the present invention. Based on the embodiments of the present invention, all the other embodiments which are obtained by those skilled in the art without offering the creative work belong to the protection scope of the present invention.

The present invention provides the method, system and device for monitoring an error code of a CPRI link, which solve the problem that the error code can be monitored only under the condition of interrupting the service in the related art.

In the method provided by the embodiment of the present invention, before monitoring the error code, it is needed to pre-define an FCS field as the transmission carrier and judgement standard of the error code monitoring.

Wherein, the FCS field can be preferably defined in a section of user-defined region which is reserved in the CPRI standard control word. One or more fields can be selected from the region to be defined as CPRI link error code check fields FCS. This processing is described below in detail by taking four selected fields as an example.

Four fields are selected from the user-defined region to be defined as the CPRI link error code check fields FCS, the corresponding basic frame numbers of the four fields are respectively: M, M+64, M+128, M+192, wherein M (smaller than 64) is one selected user-defined field. The above selection of the basic frame numbers is only a preferable mode, the present invention is not limited by the selection mode.

Figure 1:
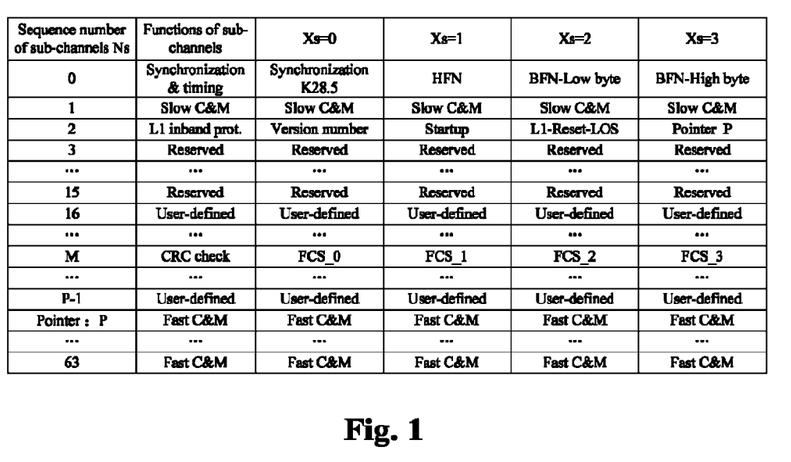
FIG. 1 shows a definition diagram of the FCS field in the CPRI control word in the method in accordance with an embodiment of the present invention.

In the embodiment of the present invention, in order to adopt a uniform definition for multiple link rates of the CPRI, only the low 8 bit of the four control words are used to form the 32 bit FCS field. FIG. 1 shows the definition diagram of the FCS field in the CPRI control word in the embodiment of the present invention, where FCS_0, FCS_1, FCS_2, FCS_3 are all low 8 bit of the control words, and the four control words form one 32 bit FCS field, wherein FCS_0 represents bit 7 to 0 of the FCS, FCS_1 represents bit 15 to 8 of the FCS, FCS_2 represents bit 23 to 16 of the FCS, and FCS_3 represents bit 31 to 24 of the FCS. In FIG. 1, P is an initial position of the defined fast C&M, the selected M value must satisfy 16<M<P. It should be noted that, in FIG. 1, the function of the sub-channel of which the sun-channel sequence number is 2 is L1 inband prot., and when Xs is equal to 1, it is defined as startup.

Usually, different CPRI link rates correspond to different lengths of the control words, specifically: when the CPRI link rate is 614.4 Mbps, the length of the control word is 8 bit; when the CPRI link rate is 1.2288 Gbps, the length of the control word is 16 bit; when the CPRI link rate is 2.4576 Gbps, the length of the control word is 32 bit; when the CPRI link rate is 3.072 Gbps, the length of the control word is 40 bit; when the CPRI link rate is 4.9152 Gbps, the length of the control word is 64 bit; when the CPRI link rate is 6.144 Gbps, the length of the control word is 80 bit; when the CPRI link rate is 9.8304 Gbps, the length of the control word is 128 bit. In order to adapt for various link rates, the selected length of the control word is preferably defined as 8 bit in the embodiment of the present invention.

Based on the definition foundation of the above FCS field, the basic principle of the method in accordance with the embodiment of the present invention is described as follows. A CRC generating functional module is added on the transmitting end of the CPRI link, and the system appoints to adopt a uniform CRC generation polynomial on the CPRI transmitting end and the CPRI receiving end. According to the frame timing reference of the CPRI, the CRC generating functional module implements CRC calculation for all the data in one super-frame of the CPRI and caches the CRC result, and then fills the cached result in the position of the FCS field of the next super-frame of the CPRI.

A CRC check functional module is added in the receiving end of the CPRI link, and the receiving end of the CPRI link adopts the system-appointed CRC polynomial. According to the frame timing reference of the CPRI, the CRC check functional module implements the CRC calculation for all the data in one super-frame of the CPRI, caches the obtained CRC result, and compares the obtained CRC result with the received contents of the CRC field at the position of the FCS field of the next super-frame of the CPRI; if they are completely the same, the check result is correct; otherwise, it is judged that there is an error code.

Certainly, the method of obtaining the FCS of the frame data by adopting the CRC calculation is one of the preferable embodiments of the present invention, all the methods capable of obtaining the FCS of the frame data are within the protection scope of the present invention.

Figure 2:
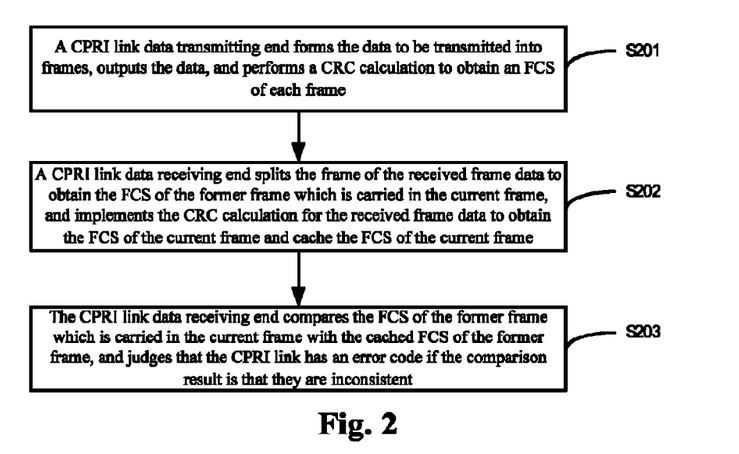
FIG. 2 shows a flowchart of the method for monitoring the error code of the CPRI link in accordance with an embodiment of the present invention.

Specifically, as shown in FIG. 2, an embodiment of the present invention provides a method for monitoring the error code of the CPRI link, comprising the steps that:

Step S201, the CPRI link data transmitting end forms data to be transmitted into frames, outputs the data, and obtains the FCS of each frame by CRC calculation; wherein, when forming the frames, the CPRI link data transmitting end adds the FCS of the former frame into the FCS field of the current frame;

Step S202, the CPRI link data receiving end splits the frame of the received frame data to obtain the FCS of the former frame which is carried in the current frame, implements the CRC calculation for the received frame data to obtain the FCS of the current frame, and caches the FCS of the current frame;

Step S203, the CPRI link data receiving end compares the FCS of the former frame which is carried in the current frame with the cached FCS of the former frame, and judges that there is an error code in the CPRI link if the comparison result is that they are inconsistent.

Preferably, in the above method, the CPRI link data receiving end also can pre-configure two timers and one counter for pre-warning of the error code.

Specifically, when a preset super-frame timer T2 expires, if the former frame is checked to have the error code and a preset error code statistical counter is not full, the CPRI link data receiving end adds one to the error code statistical counter; and when a preset error code statistical timer T1 expires, the CPRI link data receiving end judges whether the error code statistical counter reaches a preset threshold value; if yes, the CPRI link data receiving end alarms an upper level; wherein, T1>T2.

Preferably, after the error code statistical timer T1 expires, the CPRI link data receiving end caches the result counted by the error code statistical counter, and then resets the error code statistical counter.

Figure 3:
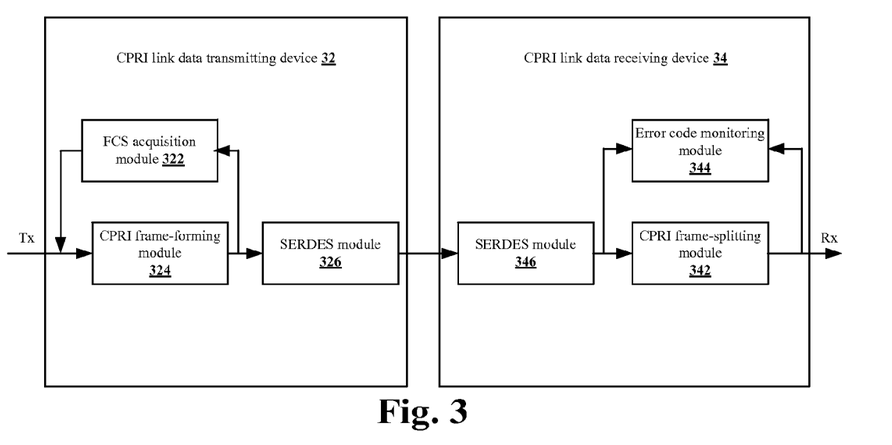
FIG. 3 shows a structural diagram of the system for monitoring the error code of the CPRI link in accordance with an embodiment of the present invention.

An embodiment of the present invention also provides a system for monitoring the error code of the CPRI link. As shown in FIG. 3, the system comprises a CPRI link data transmitting device 32 and a CPRI link data receiving device 34, wherein the CPRI link data transmitting device 32 and the CPRI link data receiving device 34 are connected via optical fibers or cables.

Specifically, as shown in FIG. 3, the CPRI link data transmitting device 32 comprises:

a CPRI frame-forming module 322, configured to form received data into frames, and then output the data to a Serialize/Deserialize (SERDES) conversion module 326 and an FCS acquisition module 324; wherein, when forming the data into frames, the FCS, which is transmitted by the FCS acquisition module 324, of the former frame is added to the FCS field of the current frame;

the FCS acquisition module 324, configured to implement the CRC calculation for the received frame data, and transmit the FCS of each frame which is obtained by calculating to the CPRI frame-forming module 322;

the SERDES module 326, configured to transmit the received frame data to the CPRI link data receiving device 34;

specifically, the CPRI link data receiving device 34 comprises:

an SERDES module 346, configured to receive the frame data, and transmit the frame data to a CPRI frame-splitting module 342 and an error code monitoring module 344;

the CPRI frame-splitting module 342, configured to implement frame-splitting processing for the received frame data, transmit the FCS to the error code monitoring module 344 after extracting the FCS of the former frame which is carried in the current frame, and then transmit the data which is implemented with frame splitting to the upper layer;

the error code monitoring module 344, configured to implement the CRC calculation for the received frame data, calculate to obtain the FCS of the current frame, cache the FCS of the current frame, compare the FCS, which is transmitted by the CPRI frame-splitting module, of the former frame with the cached FCS of the former frame, and judge that there is an error code in the CPRI link if the comparison result is that they are inconsistent.

Preferably, the above CRC calculation can be implemented by adopting the CRC calculator. The CRC calculator is one of the following calculators, but is not limited by the following types, which are CRC8, CRC10, CRC16, CRC32 or CRC64 calculator. Preferably, the CRC calculation is implemented by adopting the CRC32 calculator; when adopting the CRC32 calculator, the calculation polynomial adopted is that:

$$G(x)=x^{32}+x^{26}+x^{23}+x^{22}+x^{16}+x^{12}+x^{11}+x^{10}+x^8+x^7+x^5+x^4+x^2+x+1$$

The frame processing procedures on the transmitting and receiving directions are described below by taking the CRC32 calculator as an example.

Figure 4:
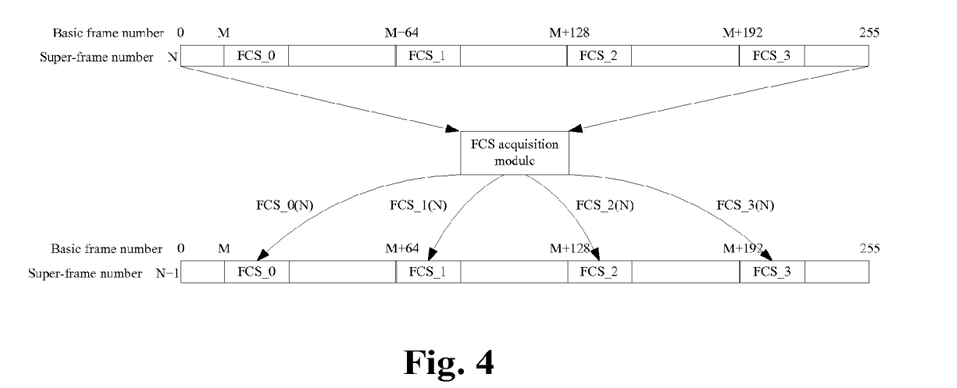
FIG. 4 shows a processing diagram of the frame data on the data transmitting direction in accordance with an embodiment of the present invention.

FIG. 4 shows the frame processing procedure diagram of the data on the transmitting direction in accordance with an embodiment of the present invention. Two data frames with CPRI super-frame numbers respectively being N and N+1 are shown in the figure. All the data of the super-frame N are transmitted to the FCS acquisition module for CRC32 calculation, bit 7~0, namely FCS_0(N), bit 15~8, namely FCS_(N), bit 23~16, namely FCS_2(N), bit 31~24, namely FCS_3(N) of the 32 bit calculation result FCS(N) are respectively filled in the low 8 bit of the control words, with the basic frame number M, M+64, M+128 and M+192, of the super-frame N+1.

Figure 5:
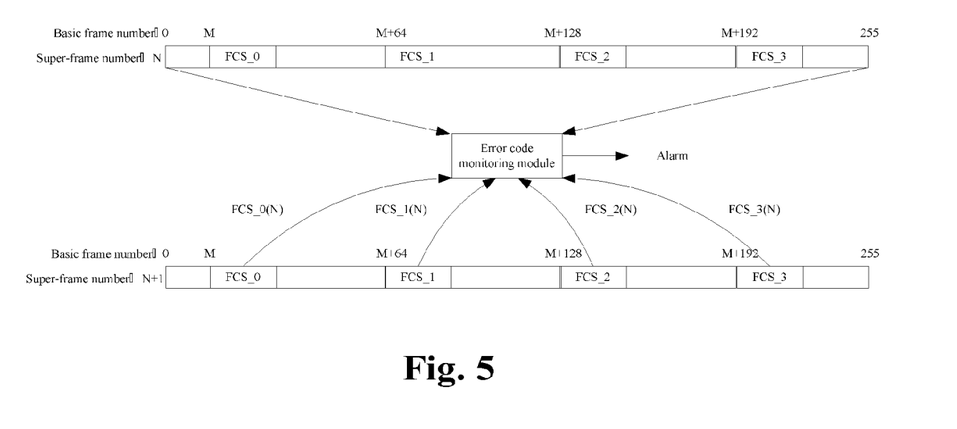
FIG. 5 shows a processing diagram of the frame data on the data receiving direction in accordance with an embodiment of the present invention.

FIG. 5 shows the frame processing procedure diagram of the data on the receiving direction in accordance with an embodiment of the present invention. Two data frames with CPRI super-frame numbers respectively being N and N+1 are shown in the figure. All the data of the super-frame N are transmitted to the error code monitoring module for CRC32 calculation, and the 32 bit calculation result FCS(N) is cached. FCS_0(N), FCS_1(N), FCS_2(N) and FCS_3(N) are respectively analyzed from the super-frame N+1, and then are combined to obtain the received CRC32 result of the super-frame N. The result is compared with the FCS(N) of the super-frame N which is calculated and cached by the module, if the comparison result is that they are the same, it is considered to be correct; if not, it is considered to be incorrect and there exists an error code.

Preferably, an error code statistical cycle timer T1, a CPRI super-frame cycle timer T2 and an error code statistical counter Err_cnt (not shown in the figures) can be arranged inside the error code monitoring module 344. Preferably, T1 is much greater than T2. In the embodiment of the present invention, the purpose of reporting the error codes and pre-warning the error codes can be achieved by using the timers and the counter to judge whether the error code rate within a preset cycle reaches a preset threshold value.

Figure 6:
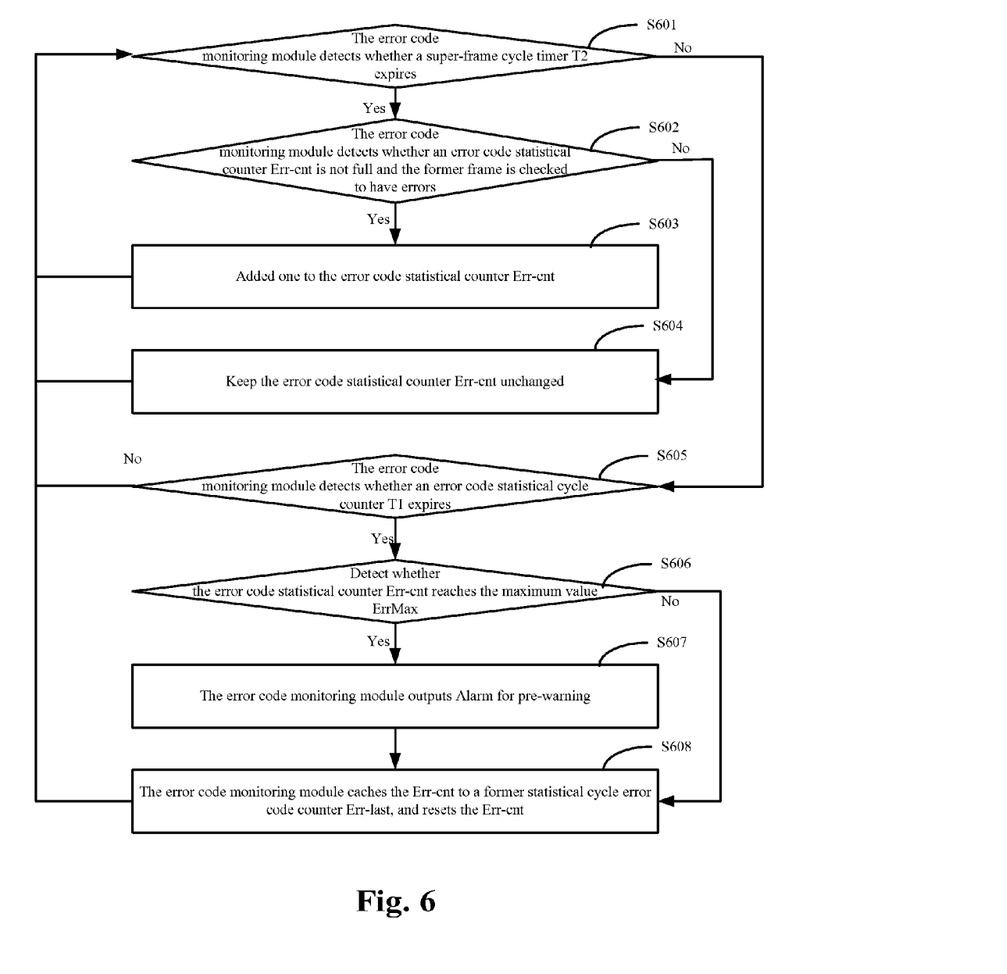
FIG. 6 shows a processing flow chart of the error code pre-warning and the error code reporting in accordance with an embodiment of the present invention.

Specifically, FIG. 6 shows the processing flow chart of the error code pre-warning and error code reporting in accordance with an embodiment of the present invention, comprising the steps that:

Step S601, the error code monitoring module 344 detects whether the super-frame cycle timer T2 expires, if yes, implement the Step S602; if not, implement the Step S605;

Step S602, the error code monitoring module 344 detects whether the error code statistical counter Err_cnt is not full and the former frame is checked to have error, if yes, implement the Step S603; if not, implement the Step S604;

Step S603, add one to the error code statistical counter Err_cnt, and return to Step S601;

Step S604, keep the error code statistical counter Err_cnt unchanged, and return to Step S601;

Step S605, the error code monitoring module 344 detects whether the error code statistical cycle timer T1 expires, if yes, implement the Step S606; if not, return to Step S601;

Step S606, detect whether the error code statistical counter Err_cnt reaches a maximum value ErrMax, if yes, implement Step S607; if not, implement Step S608;

Step S607, the error code monitoring module 344 outputs Alarm for pre-warning, and implements Step S608;

Step S608, the error code monitoring module 344 caches Err_cnt to the former statistical cycle error code counter Err_last, resets the Err_cnt, and returns to Step S601.

Wherein, by caching the value of the error code statistical counter Err_last, the system can access to search the error code conditions of the CPRI link at any moment.

Figure 7:
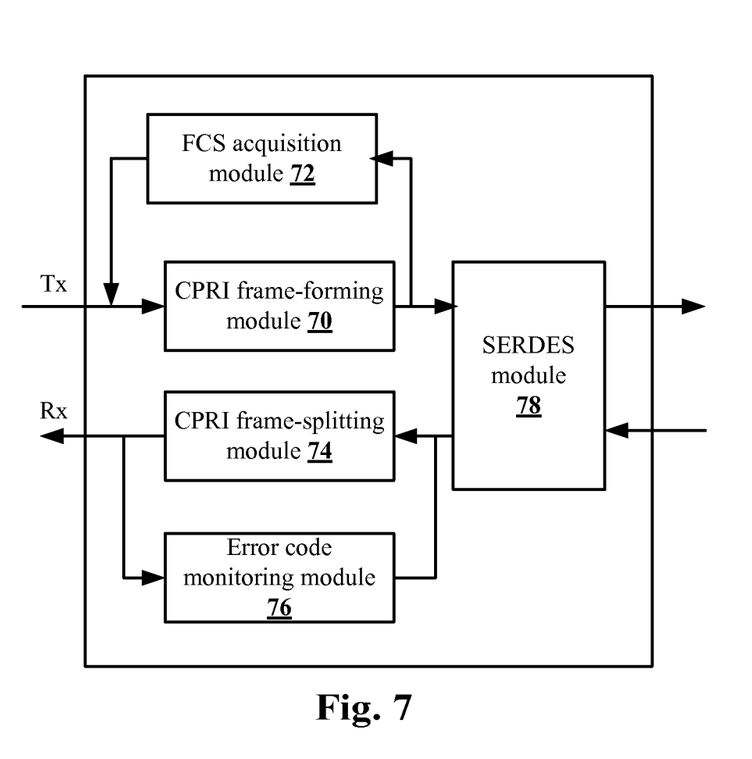
FIG. 7 shows a structural diagram of the device for monitoring the error code of the CPRI link in accordance with an embodiment of the present invention.

In addition, an embodiment of present invention also provides a device for monitoring the error code of the CPRI link. As shown in FIG. 7, the device can be arranged on the CPRI link data transmitting end or the CPRI link data receiving end, namely, the device is a data transceiver. Specifically, the device comprises:

a CPRI frame-forming module 70, configured to form the data to be transmitted into frames, and then output the data; wherein, when forming the frames, the CPRI frame-forming module 70 adds the FCS, which is transmitted by an FCS acquisition module 72, of the former frame to the FCS field of the current frame;

the FCS acquisition module 72, configured to implement CRC calculation for the frame data which are output by the CPRI frame-forming module 70 to obtain the FCS of each frame, and transmit the FCS to the CPRI frame-forming module 70;

a CPRI frame-splitting module 74, configured to split frames of the frame data which is transmitted by the CPRI link data transmitting end to obtain the FCS of the former frame which is carried in the current frame, and then transmit the FCS to an error code monitoring module 76;

the error code monitoring module 76, configured to implement the CRC calculation for the frame data which are transmitted by the CPRI link data transmitting end, calculate to obtain the FCS of the current frame, cache the FCS of the current frame, compare the FCS, which is transmitted by the CPRI frame-splitting module, of the former frame with the cached FCS of the former frame, and judge that the CPRI link has an error code if the comparison result is that they are inconsistent.

Wherein, preferably, the error code monitoring module 76 is also configured to: when the preset super-frame timer T2 expires, if the former frame is checked to have the error code and the preset error code statistical counter is not full, add one to the error code statistical counter; and is configured to judge whether the error code statistical counter reaches the preset threshold value when the preset error code statistical timer T1 expires; if yes, the error code monitoring module alarms the upper level; wherein, T1>T2.

Preferably, the error code monitoring module 76 is also configured to cache the result counted by the error code statistical counter and reset the error code statistical counter after the error code statistical timer T1 expires.

Preferably, the device also comprises an SERDES module 78 which is used as an interface of transmitting and receiving the data.

Via the method, system and device provided by the embodiments of the present invention, the following advantages can be obtained:

the embodiments of the present invention can monitor the error code condition of the CPRI link without influencing the normal service operation;

as a small amount of error codes may not influence the service under the service operation condition; in such circumstances, the method provided by the embodiments of the present invention puts forward the conception of error code rate, provides the pre-warning function when the error code rate is high, and provides effective methods for maintaining the stability of the devices; meanwhile, and the error code rate also can be used as the quantitative basis for the stability evaluation of the CPRI link;

the embodiments of the present invention can be compatible with interfaces with all kinds of rates which are defined by the CPRI standard by defining the length of the FCS control words.

Obviously, those skilled in the technical field can implement various modifications and improvements for the present invention, without departing from the scope of the present invention. Thus, if all the modifications and improvements belong to the scope of the claims of the present invention and the similar technologies thereof, the present invention is intended to contain the modifications and improvements.

What is claimed is:

1. A method for monitoring an error code of a Common Public Radio Interface (CPRI) link, comprising:
   a CPRI link data transmitting end forming data to be transmitted into frames, outputting the data, and calculating to obtain a Frame Check Sequence (FCS) of each frame; wherein, the CPRI link data transmitting end adds the FCS of a former frame into an FCS field of a current frame when forming the frame; and
   a CPRI link data receiving end splitting the frame of received frame data to obtain the FCS of the former frame which is carried in the current frame, calculating the received frame data to obtain the FCS of the current frame, caching the FCS of the current frame, comparing the FCS of the former frame which is carried in the current frame with the cached FCS of the former frame, and judging that there is an error code in the CPRI link if the comparison result is that the FCS of the former frame which is carried in the current frame is inconsistent with the cached FCS of the former frame.

2. The method according to claim 1, wherein the CPRI link data transmitting end and the CPRI link data receiving end adopt a Cyclic Redundancy Check (CRC) algorithm to obtain the FCS of the frame data.

3. The method according to claim 1, wherein the FCS field is defined in a user-defined region in a CPRI control word.

4. The method according to claim 3, wherein a length of each FCS control word which is defined in the FCS field is 8 bit.

5. The method according to claim 1, wherein after the step of the CPRI link data receiving end comparing the FCS of the former frame which is carried in the current frame with the cached FCS of the former frame, the method further comprises:
   when a preset super-frame timer T2 expires, if the former frame is checked to have the error code and a preset error code statistical counter is not full, the CPRI link data receiving end adding one to the error code statistical counter; and
   when a preset error code statistical timer T1 expires, the CPRI link data receiving end judging whether the error code statistical counter arrives a preset threshold value, if yes, the CPRI link data receiving end alarming an upper level; wherein T1>T2.

6. The method according to claim 5, wherein after the error code statistical timer T1 expires, the CPRI link data receiving end caching a result counted by the error code statistical counter, and then resetting the error code statistical counter.

7. A system for monitoring an error code of a CPRI link, comprising:
   a CPRI link data transmitting device, which comprises:
   a CPRI frame-forming module, configured to form data to be transmitted into frames, and then output the data; wherein, when forming the frames, the CPRI frame-forming module adds an FCS, which is transmitted by an FCS acquisition module, of a former frame into an FCS field of a current frame;
   the FCS acquisition module, configured to receive frame data which are output by the CPRI frame-forming module, calculate to obtain the FCS of each frame, and transmit the FCS to the CPRI frame-forming module;
   a CPRI link data receiving device, which comprises:
   a CPRI frame-splitting module, configured to split the frame of the frame data which is output by the CPRI frame-forming module to obtain the FCS of the former frame which is carried in the current frame, and transmit the FCS to an error code monitoring module;
   the error code monitoring module, configured to calculate the frame data which is transmitted by the CPRI frame-forming module to obtain the FCS of the current frame and cache the FCS of the current frame, compare the FCS of the former frame which is transmitted by the CPRI frame-splitting module with the cached FCS of the former frame, and judge that there is an error code in the CPRI link if the comparison result is that the FCS of the former frame which is transmitted by the CPRI frame-splitting module is inconsistent with the cached FCS of the former frame.

8. The system according to claim 7, wherein
   the error code monitoring module is further configured to:
   when a preset super-frame timer T2 expires, if the former frame is checked to have the error code and a preset error code statistical counter is not full, add one to the error code statistical counter; and is configured to:
   when a preset error code statistical timer T1 expires, judge whether the error code statistical counter arrives a preset threshold value, if yes, alarm an upper level; wherein, T1>T2.

9. The system according to claim 8, wherein the error code monitoring module is further configured to: after the error code statistical timer T1 expires, cache a result counted by the error code statistical counter and reset the error code statistical counter.

10. A device for monitoring an error code of a CPRI link, comprising:
    a CPRI frame-forming module, configured to form data to be transmitted into frames, and then output the data; wherein, when forming the frames, the CPRI frame-forming module adds an FCS, which is transmitted by an FCS acquisition module, of a former frame into an FCS field of a current frame;
    the FCS acquisition module, configured to receive frame data which are output by the CPRI frame-forming module, calculate to obtain the FCS of each frame, and transmit the FCS to the CPRI frame-forming module;
    a CPRI frame-splitting module, configured to split the frame of the frame data which is transmitted by a CPRI link data transmitting end to obtain the FCS of the former frame which is carried in the current frame, and transmit the FCS to an error code monitoring module;
    the error code monitoring module, configured to calculate the frame data which is transmitted by the CPRI link data transmitting end to obtain the FCS of the current frame and cache the FCS of the current frame, compare the FCS of the former frame which is transmitted by the CPRI frame-splitting module with the cached FCS of the former frame, and judge that there is an error code in the CPRI link if the comparison result is that the FCS of the former frame which is transmitted by the CPRI frame-splitting module is inconsistent with the cached FCS of the former frame.

11. The device according to claim 10, wherein
    the error code monitoring module is further configured to:
    when a preset super-frame timer T2 expires, if the former frame is checked to have the error code and a preset error code statistical counter is not full, add one to the error code statistical counter; and is configured to:
    when a preset error code statistical timer T1 expires, judge whether the error code statistical counter arrives a preset threshold value, if yes, alarm an upper level; wherein, T1>T2.

12. The device according to claim 11, wherein
    the error code monitoring module is further configured to:
    after the error code statistical timer T1 expires, cache a result counted by the error code statistical counter and reset the error code statistical counter.

13. The method according to claim 2, wherein after the step of the CPRI link data receiving end comparing the FCS of the former frame which is carried in the current frame with the cached FCS of the former frame, the method further comprises:

when a preset super-frame timer T2 expires, if the former frame is checked to have the error code and a preset error code statistical counter is not full, the CPRI link data receiving end adding one to the error code statistical counter; and when a preset error code statistical timer T1 expires, the CPRI link data receiving end judging whether the error code statistical counter arrives a preset threshold value, if yes, the CPRI link data receiving end alarming an upper level; wherein T1>T2.

14. The method according to claim 3, wherein after the step of the CPRI link data receiving end comparing the FCS of the former frame which is carried in the current frame with the cached FCS of the former frame, the method further comprises:

when a preset super-frame timer T2 expires, if the former frame is checked to have the error code and a preset error code statistical counter is not full, the CPRI link data receiving end adding one to the error code statistical counter; and when a preset error code statistical timer T1 expires, the CPRI link data receiving end judging whether the error code statistical counter arrives a preset threshold value, if yes, the CPRI link data receiving end alarming an upper level; wherein T1>T2.

15. The method according to claim 4, wherein after the step of the CPRI link data receiving end comparing the FCS of the former frame which is carried in the current frame with the cached FCS of the former frame, the method further comprises:

when a preset super-frame timer T2 expires, if the former frame is checked to have the error code and a preset error code statistical counter is not full, the CPRI link data receiving end adding one to the error code statistical counter; and when a preset error code statistical timer T1 expires, the CPRI link data receiving end judging whether the error code statistical counter arrives a preset threshold value, if yes, the CPRI link data receiving end alarming an upper level; wherein T1>T2.

16. The method according to claim 13, wherein after the error code statistical timer T1 expires, the CPRI link data receiving end caching a result counted by the error code statistical counter, and then resetting the error code statistical counter.

17. The method according to claim 14, wherein after the error code statistical timer T1 expires, the CPRI link data receiving end caching a result counted by the error code statistical counter, and then resetting the error code statistical counter.

18. The method according to claim 15, wherein after the error code statistical timer T1 expires, the CPRI link data receiving end caching a result counted by the error code statistical counter, and then resetting the error code statistical counter.

* * * * *